March 15, 1960 — L. NOVAK — 2,928,199
MOUNTING STRUCTURE FOR MIRRORS AND THE LIKE
Filed Sept. 6, 1957 — 2 Sheets-Sheet 1
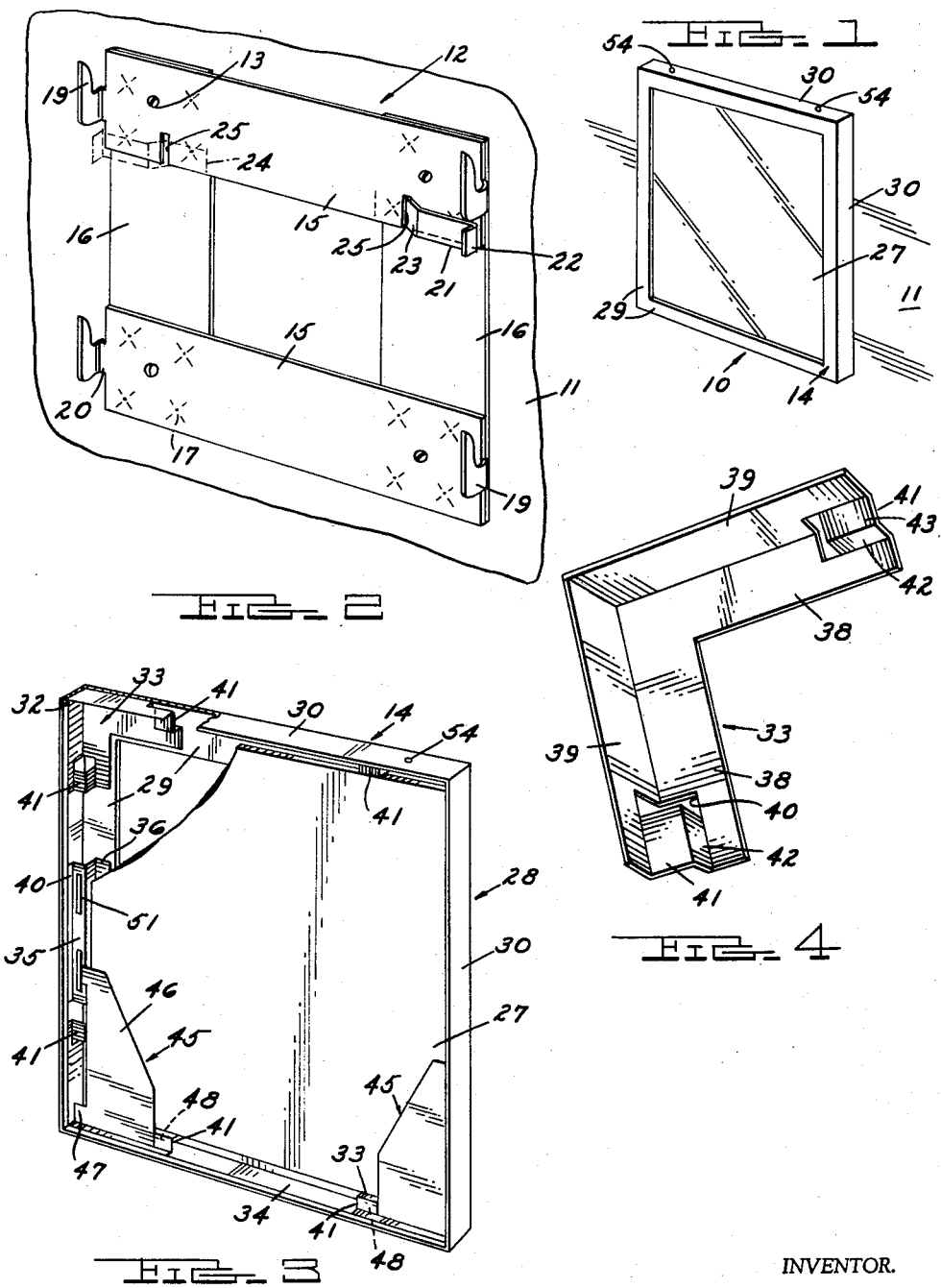
INVENTOR.
LOUIS NOVAK
BY Whittemore, Hulbert & Belknap
ATTORNEYS March 15, 1960 L. NOVAK 2,928,199
MOUNTING STRUCTURE FOR MIRRORS AND THE LIKE
Filed Sept. 6, 1957 2 Sheets-Sheet 2

INVENTOR.
LOUIS NOVAK
BY Whittemore, Hulbert
Belknap
ATTORNEYS

United States Patent Office 2,928,199
Patented Mar. 15, 1960

2,928,199

MOUNTING STRUCTURE FOR MIRRORS AND THE LIKE

Louis Novak, Detroit, Mich., assignor to Rose Novak

Application September 6, 1957, Serial No. 682,409

6 Claims. (Cl. 40—152.1)

The present invention relates to an improved mounting structure for mirrors and like wall panel units, in particular as installed in public toilets, institutions of a penal or like character, etc.

It is a general object of the invention to provide a mounting structure of this sort which is one hundred percent tamper proof, theft proof and jimmy proof, requiring no externally exposed and readily accessible securing means to hold the mirror or like panel rigidly in place; yet, on the other hand, employing securing provisions which are readily and easily manipulated by authorized personnel if it is desired to release the mirror, panel, etc. from its wall mount.

Losses due to theft of wall mirrors and the like from public places, such as automobile service station toilet rooms, public toilets, and the like, each year amount to many thousands of dollars indeed. Experience has also shown that existing similar panel wall installations in public institutions, such as mental hospitals, prisons, jails, etc. are an open invitation to the inmates to pry or jimmy the unit off the wall, as a source of material for weapons. The present invention affords a strong and displacement resisting mount for a wall panel of the sort in question, as well as wall mountings of many different kinds (for example, bulletin boards, advertising displays, etc.) which is proof against theft and unauthorized removal generally.

To this end, it is an object of the invention to provide a mounting structure which does not rely upon the use of externally exposed and accessible screws, hooking provisions, clamps, latches or the like. On the contrary, all of the wall securing provisions are completely enclosed within the internal confines of the panel structure which is mounted.

Another object is to provide a panel mounting structure as described, in which the exposed panel is readily slipped into place against the wall and latched in a firmly locked position by a single movement of the mirror or like panel in the hands of the installer.

Yet another object is to provide a mounting unit of this sort, in which the panel in question, when positioned as described in the preceding paragraph, is positively latched and held in place by resilient metal spring members.

A further object is to provide latching provisions in a mounting structure of the sort under consideration, in which the latch springs are readily released to permit removal of the panel by the use of a simple release tool furnished to authorized personnel along with instructions regarding the simple manner of manipulating this tool.

Another object is to provide, in a theft proof and jimmy proof mount, or in a panel mounting device which does not necessarily incorporate such protective features, a novel and improved means for holding a mirror or similar panel element securely in place in relation to a mounting frame, which frame is to be applied to the wall. The provisions to this end are extremely simple in character, and have a novel relationship to the frame such as enables their application in a moment's time.

The foregoing as well as other objects become more apparent as this description proceeds, especially when considered in connection with the accompanying drawings illustrating a preferred embodiment of the invention, wherein:

Fig. 1 is a perspective view of a mirror or like panel unit to which the mounting provisions of the invention apply;

Fig. 2 is a perspective view of a built-up hanger component of the mounting structure, as rigidly applied to a wall or like surface and ready to receive a mirror or like panel mounting frame;

Fig. 3 is a rear perspective view, partially broken away, of the frame in question;

Fig. 4 is a rear perspective view of an individual frame corner member, shown in Fig. 3 in assembled relation to the frame;

Figure 5:
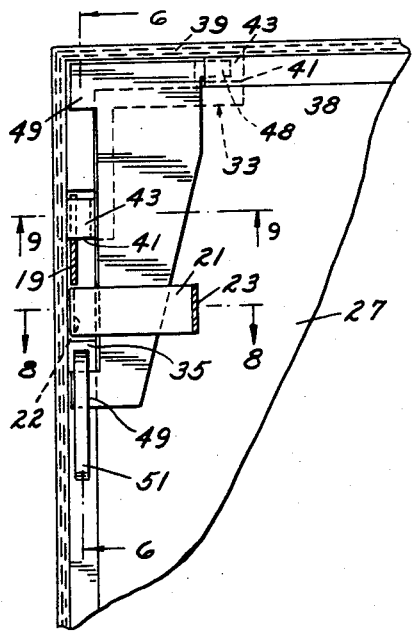
Fig. 5 is a fragmentary rear view, in vertical section on line 5—5 of Fig. 4, of a corner mount and mirror hold-down assembly of the structure.
Figure 6:
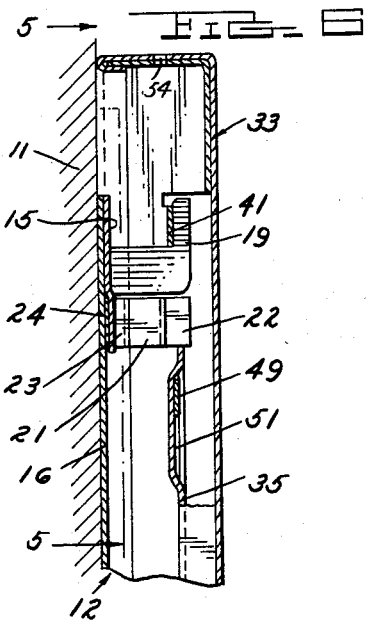
Fig. 6 is a view in vertical section on line 6—6 of Fig. 5, the mounted frame being shown latched in an operative locked position.
Figure 8:
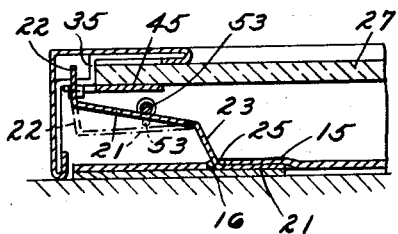
Figure 7:
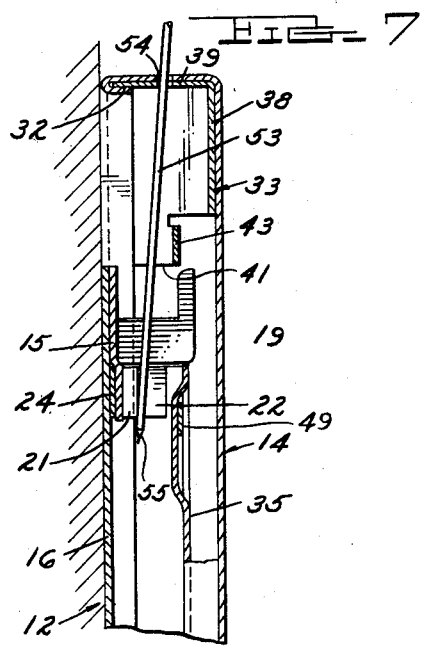
Figure 9:
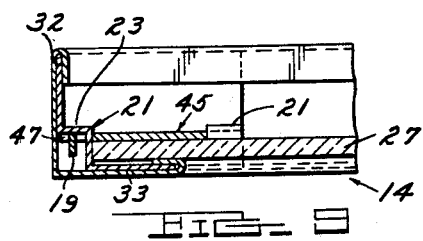

Fig. 7 is a view in section similar to Fig. 6, showing the manner of manipulating a manual releasing tool to disengage the latch parts, the frame being shown in an unlatched position; and Figs. 8 and 9 are, respectively, views in horizontal section on lines 8—8 and 9—9 of Fig. 5.

The improved structure of the invention involves two basic component sub-assemblies used in building up the mirror or like panel unit, designated 10 in Fig. 1, to provide for the theft and jimmy proof mounting of the same on a wall or like surface 11. These sub-assemblies are the hanger unit 12, appearing in Fig. 2 and shown as rigidly secured to the wall surface 11, as by screws 13; and the frame unit 14 of Fig. 3.

The hanger unit 12 comprises pairs of parallel, horizontally disposed hanger straps 15 of rigid steel plate material, and vertical cross braces 16 of similar steel strap construction. The pairs of straps are overlapped and welded together in a rectangular outline, as indicated at 17, to constitute the rigidly braced hanger unit 12. The same is directly applied to the surface 11 as described.

Projecting ends of the horizontal hanger straps 15 are stamped to provide terminal hanger hooks 19, which extend longitudinally outwardly somewhat at 20 beyond the main body of each strap, and are offset 90° forwardly, or in the direction away from the wall 11 and toward the rear of the frame 14 when the structure 10 is assembled.

The reference numeral 21 designates a leaf spring latch, of which two may be provided, one adjacent each end of the top hanger strap 15, one of these latches being indicated in dot-dash line in Fig. 2. However, a single latch will suffice to hold the cover 14 locked in place, in the manner hereinafter described. Each latch 21 is formed of a high grade of relatively thin spring steel, having a 90° rearwardly offset terminal locking tongue or ear 22, an acutely forwardly angled intermediate offset at 23 and an inner mounting or anchor portion 24, by which the latch is secured to the hanger 12.

For the purpose of assembling the latches 21, the uppermost hanger strap 15 is formed adjacent its ends with vertically extending linear notches 25 from its bottom edge, and prior to welding together the hanger straps 15 and cross brace straps 16 the offset 23 of the spring is slipped into this notch, thus disposing the anchor portion 24 between the two straps, in which disposition the weld is made. So assembled, the spring latches 21 diverge outwardly and forwardly in relation to the hanger 12, as illustrated in solid line in Fig. 8, which is the normal, relaxed and locking position of the latch. It is springable in a manner to be described from this position to the forward dotted line, frame release position of Fig. 8.

The hanger hooks 19 at offset ends of the hanger 12 are disposed in vertical alignment with one another and in a predetermined vertical spacing adapting the same for keyed interlocking engagement with the frame 14, as will appear. The frame 14 is of an improved, built-up construction, and a mirror or like flat panel mounted thereby is generally designated by the reference numeral 27.

Frame 14 is constituted of an externally finished sheet metal frame body 28 of rectangular outline and L-shaped cross section, including the forwardly disposed vertical, mirror retaining flanges 29 and the 90° rearwardly bent top, bottom and side flanges 30. Prior to assembly of the frame in the manner to be described, the last named flanges are unjoined at the corners of the frame 14.

The rear edges of the frame flanges 29 and 30 are crimped 180° inwardly, as best shown in Figs. 5, 6 and 7, to provide channels 32 for the sliding reception of four corner plates 33 of the character shown in Fig. 4, as well as the similar reception of pairs of intermediate top, bottom and side abutment braces 34, 35. These are best shown in Fig. 2, the numeral 34 applying to the opposed top and bottom intermediate braces and the numeral 35 to the opposed side intermediate braces.

The braces 34, 35 are of a right angular stepped cross section, each including a lateral, inwardly extending side flange 36 which abuts the rear surface of a frame flange 29 and a rearwardly extending outer flange 30 which is slid into the frame flange channel 32 in the assembly of the frame. So positioned, the braces are appropriately secured to the frame, as by spot welding.

Referring to Fig. 4, each of the corner plates 33 are of rigid sheet metal stamped in a special outline and cross section. The overall outline is L-shaped, and the plate has, on each of its 90° legs, a forwardly disposed vertical flange 38 and a pair of rearwardly disposed flanges 39 at a right angle to the flange 38. Prior to completion of the assembly to the frame, the rearward flanges 39 are separated from one another at the corner of the plate 33.

In forming this plate the ends of its legs are slotted at 40 and stamped to inwardly offset the material of the flanges 38, 39 in a manner to form an individual open ended panel sustaining seat or socket 41 of rectangular outline, the lateral inwardly facing surface 42 of which socket is engaged by the mirror or other panel 27 to sustain the latter, either horizontally or vertically; while the other, or rearwardly facing portion 43 of the socket is intended to engage over a hanger hook 19 to suspend the frame 14 on the hanger 12 in the manner to be described.

In completing the assembly of the corner plates 33 to the frame body 28, the rearwardly extending flanges 39 of the plate 33 are slipped into the channels 32 of adjoining horizontal and vertical frame flanges 30, whereupon all four flanges of the frame and corner plate are brought together and permanently secured, at all four corners of the frame structure, as by soldering or the like.

The reference numeral 45 generally designates a sheet metal hold-down plate of the improved mounting structure, of which four are provided, one for use at each of the corners of the structure. Each of these hold-down plates includes a flat body portion 46 of substantial area, an abutment or spacer lug or ear 47 at an outer corner thereof (when assembled), an oppositely extending key lug or ear 48 of somewhat smaller size, and a securing lug or ear 49 at the opposite extremity of the hold-down plate 46.

In applying the hold-down plate, with the mirror 27 in place in frame 14 between the four sockets 41 (by which it has two-point corner support, horizontally and vertically), the latching lug or ear 48 is slipped underneath the rearwardly facing portion or surface 43 of an offset socket 41 on each of the corners of the horizontal portions of the frame assembly. The plate 46 is then swung outwardly behind the rear of the panel 27, in face to face engagement therewith, and brought to the position shown in Figs. 3 and 5. In this position it may be affixed to the frame, as by means of screws (not shown) securing the ear or lug 49 to an intermediate side brace 35, a simplified operation which minimizes the time of assembly.

However, a further improvement of the invention contemplates the elimination of even this screw attaching operation, in accordance with which improvement the braces 35 are slitted and rearwardly offset to provide elongated anchoring straps 51, beneath which the securing lugs or ears 49 may be slipped and frictionally held. The third lug or ear 47 of the hold-down plate 45 serves as a spacer to engage the adjacent frame side flange and prevent endwise movement of the latch ear 48 under the latching socket 41.

In mounting the assembled frame 14 on the hanger 12, assuming the latter is disposed as desired on the wall or other surface 11, the frame 14 is lined up with the hanger 12, but somewhat higher than the latter, with the respective side sockets 41 of the corner plates positioned above the four hanger hooks 19. The frame is then pushed against the wall, so that the hooks 19 are brought directly below the respective four sockets 41 just mentioned, there being sufficient vertical space between the corner plates and the intermediate braces 35 to receive the hooks. As the frame is thus telescoped rearwardly on the hanger the intermediate abutment brace 35 flexes the leaf spring latch 21 rearwardly.

The frame 14 is then slid vertically downwardly, causing the hooks 19 to enter within the sockets 41 and the latter to come to rest on the respective offset bases 20 of the hooks, so as to firmly support the frame at all four corners in the vertical sense.

As this takes place, the spring latch 21 is rearwardly depressed toward the wall 11, the abutment brace 35 sliding thereover, but as the sockets 41 come into position on the hooks as described, the latch snaps forwardly again, so that its terminal ear 22 is disposed just above the top of the intermediate braces 35. In this position, it is thus impossible to remove the frame by vertical sliding movement.

Authorized removal of the frame 14 from the hanger 12 is performed with the aid of an unlocking key 53 (Figs. 7 and 8) inserted through a small aperture 54 in the top horizontal flange 30 of the frame, there being one of these apertures adjacent each corner in the event two latches 21 are employed.

The unlocking key or tool 53 is in the form of an elongated length of stiff steel rod, preferably pointed at its end 55. This tool is inserted downwardly of the frame and rearwardly of the leaf spring latch 21, whereupon a rocking effort is exerted on the latch to cam or force it rearwardly, i.e., from the operative latching position of Fig. 8 (solid line) to the release position shown in dotted line. Here, the terminal latch ear 22 is cleared from behind the adjacent brace 35 and with the spring latch thus held depressed, the frame 14 is lifted clear of the hooks 19.

As indicated above, a single spring latch 21 will adequately perform the tamper proof holding action desired. In the event there are two of these latching elements, they may be successively sprung to release position sufficiently to enable their latch ears 22 to rearwardly clear the braces 35 and permit the desired upward shift.

The structure is exceedingly simple and inexpensive, both as to its component parts and as to the assembly thereof. It is easily and quickly applied to and removed from a wall, and as the frame is locked in the operative position, its unauthorized removal is practically an impossibility.

What I claim as my invention is:

1. Tamper-proof mounting structure of the type described, comprising a rigid hanger unit adapted to be secured to a wall or like support, and a frame unit applicable to said hanger unit, said hanger unit being provided with an upturned hook projecting forwardly thereof and of said support when the hanger unit is secured to the latter, and having a leaf spring latch thereon extending horizontally thereof in predetermined position beneath said hook, said latch being flexible forwardly and rearwardly in relation to said hook, said frame unit having angularly meeting front and side flanges defining a rectangular frame body of larger area than said hanger unit, the side flanges being of front-to-rear depth enabling said frame unit to be positioned in front-to-rear telescoped relation over said hanger unit, said frame body having means providing a downwardly opening socket extending inwardly of said front and side flanges in a position for downward engagement over said hook to support said frame unit on said hanger unit, said frame body having a fixed internal abutment spaced sufficiently beneath said socket to permit positioning of said hook beneath said socket for the reception of said hook in said socket, with said spring latch in rearwardly flexed position relative to the hook, and to laterally receive said latch beneath said hook when said socket is downwardly engaged over the hook, said spring latch flexing forwardly to position beneath the hook and above said abutment to prevent relative vertical movement of said units as so assembled.

2. Tamper-proof mounting structure of the type described, comprising a rigid hanger unit adapted to be secured to a wall or like support, and a frame unit applicable to said hanger unit, said hanger unit being provided with an upturned hook projecting forwardly thereof and of said support when the hanger unit is secured to the latter, and having a leaf spring latch thereon extending horizontally thereof in predetermined position beneath said hook, said latch being flexible forwardly and rearwardly in relation to said hook, said frame unit having angularly meeting front and side flanges defining a rectangular frame body of larger area than said hanger unit, the side flanges being of front-to-rear depth enabling said frame unit to be positioned in front-to-rear telescoped relation over said hanger unit, said frame body having corner plates and means to assemble the latter in fixed and rigid bracing relation to its corners at least one of said corner plates being formed to provide a downwardly opening socket extending inwardly of said front and side flanges in a position for downward engagement over said hook to support said frame unit on said hanger unit, said frame body having a fixed internal abutment spaced sufficiently beneath said socket to permit positioning of said hook beneath said socket for the reception of said hook in said socket, with said spring latch in rearwardly flexed position relative to the hook, and to laterally receive said latch beneath said hook when said socket is downwardly engaged over the hook, said spring latch flexing forwardly to position beneath the hook and above said abutment to prevent relative movement of said units as so assembled.

3. Mounting structure in accordance with claim 2, in which said corner plate is L-shaped both in outline and cross section.

4. Mounting structure in accordance with claim 2, in which said corner plate is L-shaped both in outline and cross section, having said socket offset inwardly from intersecting portions of one leg thereof and having a similar socket similarly located and offset from intersecting portions of the other leg thereof.

5. Mounting structure in accordance with claim 2, in which said corner plate is L-shaped both in outline and cross section, having said socket offset inwardly from intersecting portions of one leg thereof and having a similar socket similarly offset from intersecting portions of the other leg thereof, and a corner locking member in rearward sustaining engagement with said panel, said locking member having an edge extension positioned within one of said offset sockets and being secured to said frame unit.

6. Mounting structure in accordance with claim 2, in which said corner plate is L-shaped both in outline and cross section, having said socket offset inwardly from intersecting portions of one leg thereof and having a similar socket similarly offset from intersecting portions of the other leg thereof, and a corner locking member in rearward sustaining engagement with said panel, said locking member having an edge extension positioned within one of said offset sockets and being secured to said abutment of said frame unit.

References Cited in the file of this patent

UNITED STATES PATENTS

| | | |
|---|---|---|
| 1,857,966 | Long | May 10, 1932 |
| 1,908,147 | Hoegger | May 9, 1933 |
| 2,075,588 | Meyers | Mar. 30, 1937 |